(No Model.)  2 Sheets—Sheet 1.

W. S. BELDING.
POWER TRANSMITTING MECHANISM.

No. 440,688.  Patented Nov. 18, 1890.

Witnesses:
Frank L. Stearns
Ambrose Risdon

Inventor:
Warren S. Belding
By Cyrus Kehr
Atty.

(No Model.) 2 Sheets—Sheet 2.

W. S. BELDING.
POWER TRANSMITTING MECHANISM.

No. 440,688. Patented Nov. 18, 1890.

Witnesses:
Frank L. Sturms,
Ambrose Risdon

Inventor:
Warren S. Belding
By Cyrus Kehr,
Attorney.

UNITED STATES PATENT OFFICE.

WARREN S. BELDING, OF CHICAGO, ILLINOIS.

POWER-TRANSMITTING MECHANISM.

SPECIFICATION forming part of Letters Patent No. 440,688, dated November 18, 1890.

Application filed February 24, 1890. Serial No. 341,426. (No model.)

*To all whom it may concern:*

Be it known that I, WARREN S. BELDING, a citizen of the United States, residing at Chicago, in the county of Cook and State of Illinois, have invented certain new and useful Improvements in Power-Transmitting Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a duplex power-transmitting mechanism consisting of two members mounted upon the same shaft or axis, one member being adapted to operate the shaft in one direction, while the other member is adapted to operate the shaft in the opposite direction at the same or a different speed or in the same direction at a different speed. The apparatus may also be used for taking power from a rotating shaft to operate extraneous mechanism.

Figure 1:
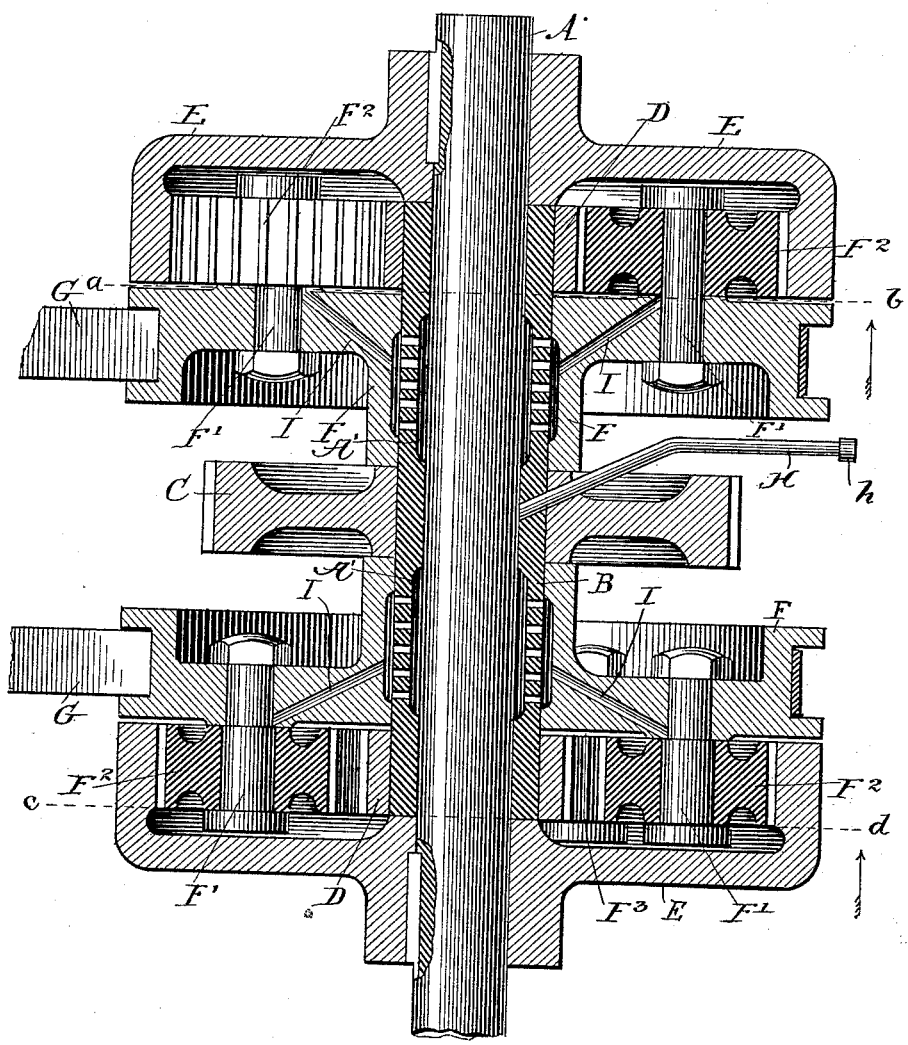
Figure 2:
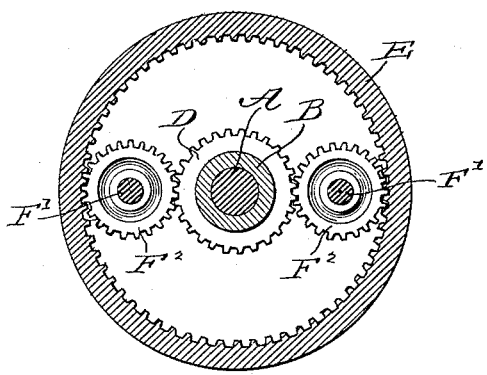
Figure 3:
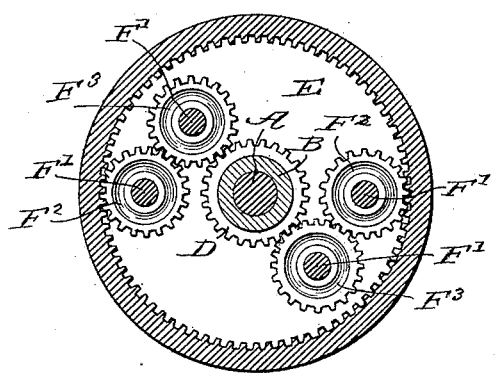
Figure 4:
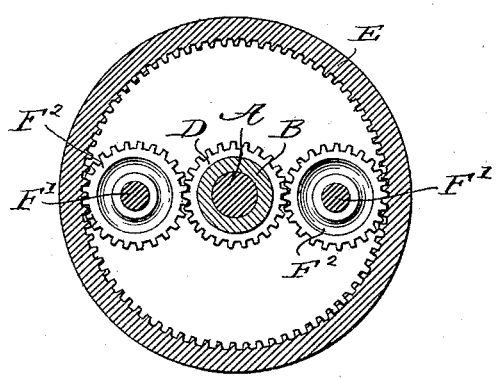
Figure 5:
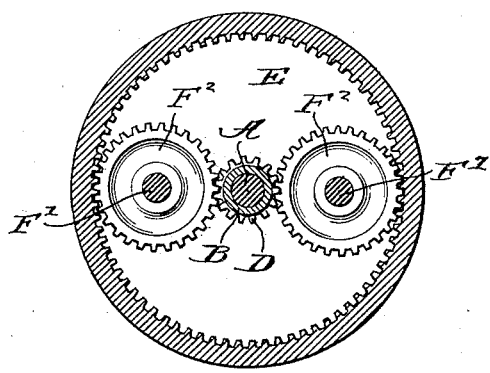

In the accompanying drawings, Figure 1 is a longitudinal section through the mechanism. Fig. 2 is a transverse section in line $a\ b$ of Fig. 1, and Fig. 3 is a section in line $c\ d$ of Fig. 1. Figs. 4 and 5 are detail views.

In said drawings, A is the shaft to which power is to be imparted or from which power is to be taken. The apparatus is to be considered first in its application for imparting power to the shaft A.

B is a sleeve or hollow shaft loosely surrounding the shaft A. For the purpose of aiding lubrication the internal diameter of said shaft B is increased along its middle so as to leave a space A' for oil between the shaft A and the shaft B.

C is a wheel surrounding the middle of the shaft B and keyed or otherwise rigidly secured thereto. Said wheel may be a gear-wheel to be driven by other gears, or it may be a pulley to be driven by a belt or chain, or it may be driven by any other means—as, for example, friction or electro-magnetism.

On each end of the shaft B is mounted a spur-gear D. These are keyed upon said shaft B so as to rotate with the shaft. Adjacent to each end of the shaft B a wheel E is mounted directly upon the shaft A and keyed thereto so as to rotate with said shaft. Each of said wheels E has an internal gear-flange about its circumference directed over the wheel D at a considerable distance from the periphery of the latter. Adjacent to the inner side of each of the wheels D is a brake-wheel F loosely surrounding the shaft B and of about the same diameter as the wheel E. Each wheel F has one or more studs F' extending at right angles to its plane into the space between the wheel D and the internal gear of the wheel E, and each such stud supports a loose spur-gear $F^2$, meshing into the internal gear of the wheel E, and at the top in Fig. 1 each of said wheels $F^2$ also meshes into the spur-wheel D. At the bottom of said figure the wheels $F^2$ do not mesh directly into the wheel D; but an intermediate idle spur-wheel $F^3$ is so located as to mesh into adjacent wheels $F^2$ and D, so that said wheels $F^2$ and D operate upon each other through the medium of said idle-wheel. By this modification this member of the mechanism is made to operate in a direction opposite to that in which the member of the mechanism at the top operates.

G G are ordinary friction-straps arranged to engage the periphery of the wheels F, each being provided with suitable means for forcing it into contact with its wheel.

The operation is as follows: Supposing power to be applied constantly to the wheel C, then said wheel, the shaft B, and both spur-wheels D will rotate in unison. The spur-wheel in the member of the mechanism at the top will rotate the wheels $F^2$ in an opposite direction, and since the latter mesh into the internal gear of the wheel E the latter must be turned by the spur-wheel $F^2$, or said wheel E must offer sufficient resistance to cause the wheel $F^2$ to travel upon said internal gear and turn the brake-wheel F upon the shaft B. When the brake-strap G does not engage the wheel F, the resistance of the latter is so small as to allow it to turn upon the shaft B in response to the force exerted by the wheels D and E; but when the brake-strap G is drawn the wheel F is held rigidly, and the wheels $F^2$ are no longer free to revolve around the internal gear of the wheel E. Consequently the wheel D acts directly upon the internal gear of the wheel E through the wheels F², thus rotating the wheel E and also the shaft A, to which the wheel E is keyed. The section shown in Fig. 2 is taken looking toward the top. Supposing the wheels C and D to be rotating in either direction, then the wheels F² will rotate in the opposite direction, and the periphery of the latter will carry the wheel E in the opposite direction also, and since the wheel E is keyed to the shaft A the latter will also be rotated in a direction opposite to the direction in which the wheels C and D are rotated. Looking at the gearing of the second member of the mechanism from the same direction it will be seen that the wheel D will rotate the wheel F³ in an opposite direction, while the latter will rotate the wheels F² in the same direction, and that the latter will rotate the wheel E and shaft A in the same direction as the direction in which the wheels C and D rotate. It is apparent, then, that the shaft A may be at rest while the wheel C is running in response to the extraneous power applied to it, and that if it is desired to rotate said shaft in one direction one of the brake-wheels F is to be engaged, and that if it is desired to rotate said shaft in the other direction the other brake-wheel is to be engaged. It is to be noted, also, that the rotation of the wheels E may be made the ultimate object of the apparatus. Suppose, for example, that said wheels bear grinding or polishing surfaces. Then they may be mounted loosely upon a bearing, and the materials to be ground or polished held against them while they rotate; or suppose each to be provided with an external gear engaging external machinery independently of the mechanism engaged by the other, then the wheels E may be mounted loosely upon a bearing.

The operation of the apparatus may be reversed. Suppose the shaft A to be rotating continuously in one direction. Then the wheel C may be rotated in either direction by holding the proper wheel F.

The apparatus may be modified to rotate the shaft A in the same direction by securing either of the wheels F, but at one speed by securing one of said wheels and at another speed by securing the other of said wheels. This I accomplish by using in each member the same arrangement of gears, either that shown in Fig. 2 or that shown in Fig. 1, but varying the relative size of the wheels, so that in one member the wheel D will rotate the corresponding wheel E at another speed either greater or less than the speed of the other wheel E. (See Figs. 4 and 5.) With this arrangement of the apparatus the shaft A may also be operated continuously and motion imparted to the wheel C in only one direction, but at two different velocities.

The shaft B may be solid instead of hollow when the shaft A is not present to extend through said shaft B. When the rotation of the wheels E is made the ultimate object, then said wheels need not be connected by a shaft A, but each may be supported independently of the other, and the shaft A not extended through the shaft B.

In each form of construction and mode of operation the two members of the mechanism differ in motion, either as to velocity or direction, or both.

Attention is now directed to the means for lubricating my mechanism. A tube H is extended toward the axis between the wheel C and one of the wheels F, and then extended obliquely through the wheel C and shaft B, so that it opens into the space between said shaft B and the shaft A. At its outer end said tube is provided with any suitable cap or plug $h$. The shaft B is provided with radial perforations within the hubs of the wheels F. Opposite such perforations tubes I extend through said hubs obliquely outward to the bearings of the wheels F² and F³.

To lubricate the apparatus, the lubricating material is poured into the tube H and allowed to descend into the space A' around the shaft A. From this space the lubricating material is carried radially outward by centrifugal action through the tubes I to the bearings of the wheels F² and F³.

In another application for Letters Patent for power-transmitting mechanism filed by me April 28, 1890, Serial No. 349,820, I claim, broadly, the group of mechanical parts constituting one of the members of the duplex transmitting mechanism shown herein. Claims 1 to 6, inclusive, of this application are limited to the duplex form of the mechanism. Claim 7 of this application is not so limited; but is, however, limited to the combination embodying the means for lubricating shown herein.

I claim as my invention—

1. The combination, with a shaft B, of a wheel C, mounted upon said shaft, wheels E, constructed substantially as described and arranged axially in line with said shaft, wheels D, mounted upon said shaft adjacent to each wheel E, and a loose brake-wheel F, arranged axially in line with said shaft and said wheels E, one adjacent to each of the latter, and each supporting loose spur-wheels extending between and engaging with the wheels D and the gears of the adjacent wheels E, substantially as shown and described.

2. The combination, with a shaft B, of a wheel C, mounted upon said shaft, wheels E, constructed substantially as described and arranged axially in line with said shaft, wheels D, mounted upon said shaft adjacent to each wheel E, and loose brake-wheels F, arranged axially in line with said shaft and said wheels E, one adjacent to each of the latter, and each supporting loose spur-wheels extending between and engaging with the wheels D and the gears of the adjacent wheels E, the relation of said wheels supported by the brake-wheel F to the adjacent wheel D differing from the relation between the wheels supported by the other brake-wheel F to the other wheel D to the end that one member of the clutch may differ in motion from the other, substantially as shown and described.

3. The combination, with a shaft B, of a wheel C, mounted upon said shaft, wheels E, constructed substantially as described and arranged axially in line with said shaft, wheels D, mounted upon said shaft adjacent to each wheel E, and a loose brake-wheel F, arranged axially in line with said shaft and said wheels E, one adjacent to each of the latter and one supporting spur-wheels $F^2$ in the space between the adjacent wheel D and the gears of the wheel E and engaging said gears and said wheel D, and the other of said brake-wheels supporting wheels $F^2$ between the adjacent wheel D and the gears of the adjacent wheel E and meshing only into the latter, and said last-mentioned brake-wheel also supporting a wheel $F^3$ in the space between the wheel D and the gears of the wheel E and meshing into the wheel D and the adjacent wheel $F^2$, substantially as shown and described.

4. The combination, with the shaft A, of a shaft B, surrounding the shaft A, a wheel C, mounted upon the shaft B, wheels E, constructed substantially as described and mounted upon said shaft A, wheels D, mounted upon said shaft B adjacent to each wheel E, and a loose brake-wheel F, arranged axially in line with said shaft and said wheels E, one adjacent to each of the latter, and each supporting loose spur-wheels extending between and engaging with the wheels D and the gears of the adjacent wheels E, substantially as shown and described.

5. The combination, with a shaft B, of a wheel C, mounted upon said shaft, wheels E, constructed substantially as described and mounted upon a shaft A, wheels D, mounted upon said shaft B adjacent to each wheel E, and a loose brake-wheel F, arranged axially in line with said shaft and said wheels E, one adjacent to each of the latter, and each supporting loose spur-wheels extending between and engaging with the wheels D and the gears of the adjacent wheels E, the relation of said wheels supported by the brake-wheel F to the adjacent wheel D differing from the relation between the wheels supported by the other brake-wheel F to the other wheel D to the end that one member of the clutch may differ in motion from the other, substantially as shown and described.

6. The combination, with a shaft B, of a wheel C, mounted upon said shaft, wheels E, constructed substantially as described and mounted upon the shaft A, wheels D, mounted upon said shaft B adjacent to each wheel E, and a loose brake-wheel F, arranged axially in line with said shaft and said wheels E, one adjacent to each of the latter, and one supporting spur-wheels $F^2$ in the space between the adjacent wheel D and the gears of the wheel E and engaging said gears and said wheel D, and the other of said brake-wheels supporting wheels $F^2$ between the adjacent wheel D and the gears of the adjacent wheel E and meshing only into the latter, and said last-mentioned brake-wheel also supporting a wheel $F^3$ in the space between the wheel D and the gears of the wheel E and meshing into the wheel D and the adjacent wheel $F^2$, substantially as shown and described.

7. The combination, with the shaft B, of a wheel C, mounted upon said shaft, a wheel E, constructed substantially as described and arranged axially in line with said shaft, a wheel D, mounted upon said shaft adjacent to said wheel E, a loose brake-wheel F, surrounding said shaft adjacent to said wheel E and supporting loose spur-wheels extending between and engaging with the wheel D and the gears of the wheel E, and a tube H, leading into the space in the interior of said shaft B, and said shaft having openings from said space into the hub of said wheel F and said wheel F having passages I leading from said hub opposite said openings in said shaft outward through the wheel F to the bearings of the wheels supported by said wheel F, substantially as shown and described.

In testimony whereof I affix my signature, in presence of two witnesses, this 3d day of February, 1890.

WARREN S. BELDING.

Witnesses:
CYRUS KEHR,
AMBROSE RISDON.